(No Model.) 3 Sheets—Sheet 1.

B. G. LAMME.
NON-SYNCHRONOUS ELECTRIC MOTOR.

No. 599,940. Patented Mar. 1, 1898.

WITNESSES:
Ethan J. Dodds
Hubert C. Tener

INVENTOR
Benjamin G. Lamme
BY
Wesley G. Carr
ATTORNEY.

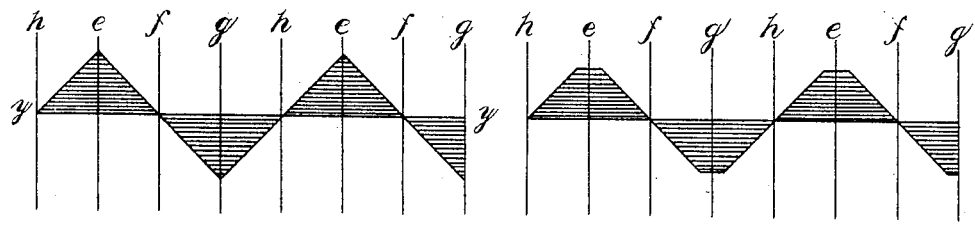
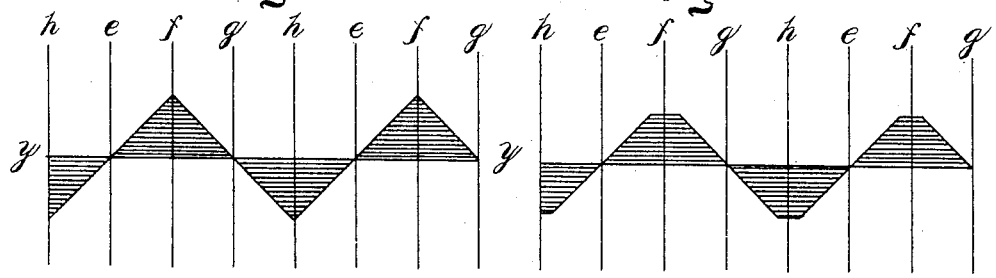
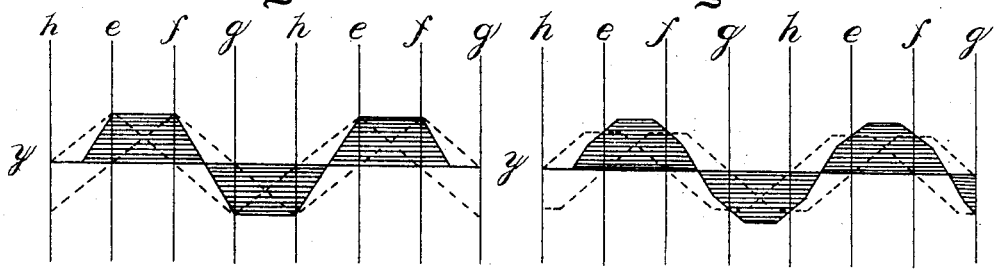

(No Model.) 3 Sheets—Sheet 3.

B. G. LAMME.
NON-SYNCHRONOUS ELECTRIC MOTOR.

No. 599,940. Patented Mar. 1, 1898.

WITNESSES:
George Brown Jr.
H. C. Tener

INVENTOR
Benjamin G. Lamme
BY
Terry and MacKaye
ATTORNEYS.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

NON-SYNCHRONOUS ELECTRIC MOTOR.

SPECIFICATION forming part of Letters Patent No. 599,940, dated March 1, 1898.

Application filed April 30, 1894. Serial No. 509,503. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Non-Synchronous Electric Motors, (Case No. 599,) of which the following is a specification.

My invention relates to alternating-current electric motors, and more particularly to such motors pertaining to this general class as are operated by the inductive action of two or more currents differing in phase and generally known as "rotary-field" or "Tesla" motors.

The object of my invention is to provide a form of winding for the primary members of rotary-field motors which, when supplied with multiphase currents, will produce a rotating field that closely approximates in effect a single pole of uniform strength mechanically rotated.

In motors of the Tesla type as constructed prior to my invention the resultant poles as they revolve and draw after them the armature vary in strength and in distribution of lines, as will be seen from the following description and the drawings accompanying the same. The result is that there is an uneven or non-uniform torque productive of dead-points which is liable to produce difficulty in starting. Furthermore, the fluctuations in the strengths of the magnetic poles produce secondary currents in the coils and in the iron of the machine and thus entail losses of energy through heating of the coils and iron. By the employment of my invention these difficulties are obviated and all the advantages of uniformity of torque and of pole strength are obtained.

My invention is illustrated in the accompanying drawings, wherein—

Figure 1:
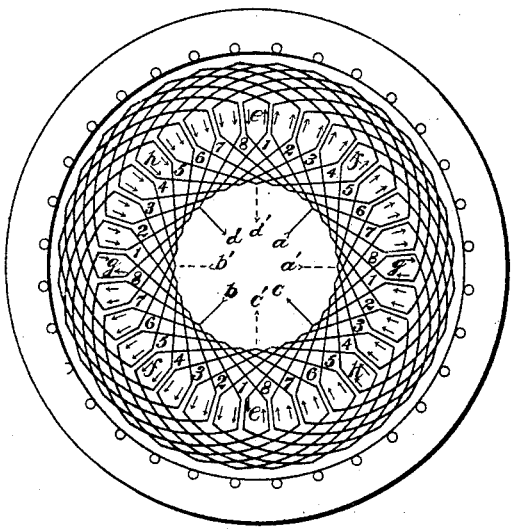
Figure 2:
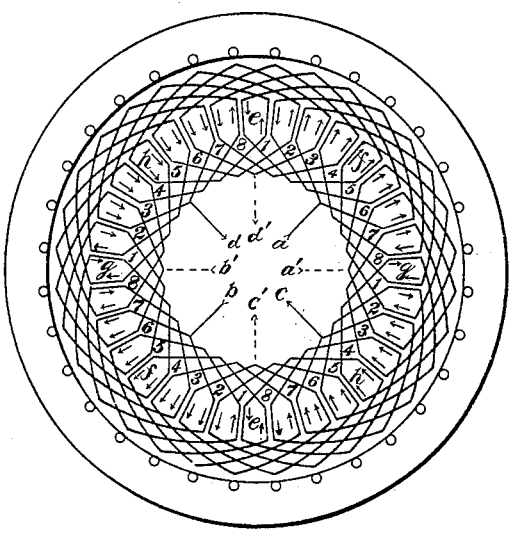
Figure 3:
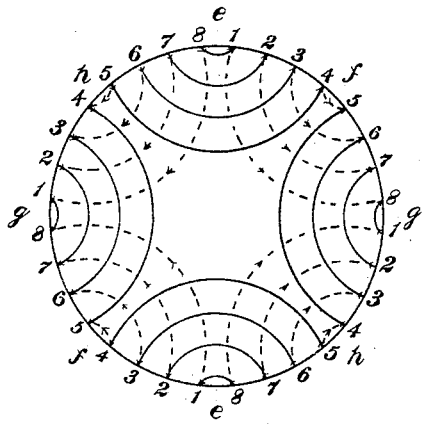
Figure 4:
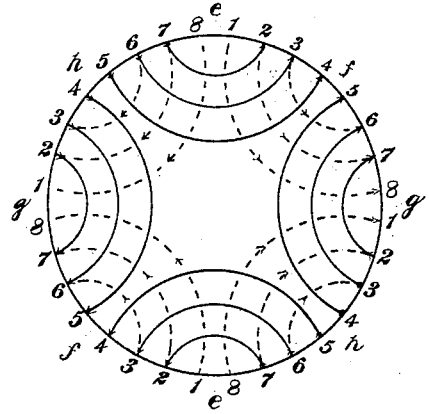

Figure 1 is a diagram of an old form of Tesla four-pole motor wherein the primary member or field-magnet is the rotating member. Fig. 2 is a similar diagram of a machine the primary member or field-magnet of which is wound in accordance with my invention. In both Figs. 1 and 2 the core-slots in the primary member of the motor are indicated as radial and the conductors as located side by side therein for convenience of illustration. In practice the slots and conductors will be located as is usual in armatures of the drum type. Fig. 3 is a diagram illustrating the relative position and direction of the effective field-producing currents in the machine represented in Fig. 1; and Fig. 4 is a similar diagram illustrating the relative position and direction of the field-producing currents in the machine represented in Fig. 2, one of the phases of current being indicated by full lines and the other by broken lines. Fig. 5 is a diagram illustrating the differences of magnetic field strength at different portions of the rotating field-magnet shown in Fig. 1, the surface of said field-magnet being represented by a straight line and the distribution being that which occurs when one of the two phases of current supplied is at a maximum and the other is at zero. Fig. 6 is a diagram similar to Fig. 5, the distribution illustrated being that which occurs when the phase which was at a maximum in Fig. 5 is at zero. Fig. 7 is a diagram similar to Figs. 5 and 6, the distribution illustrated being that which occurs when the currents flowing in the two supply-circuits have the same value. Figs. 8, 9, and 10 are distribution-diagrams, illustrating the magnetic conditions in the field-magnet shown in Fig. 2 at instants corresponding, respectively, to those of Figs. 5, 6, and 7. Figs. 11 to 14, inclusive, show the distribution of magnetic strength in the field-magnet shown in Fig. 1, one magnetic pole being shown in full lines and the other in dotted lines, and the four figures represent the progression incident to a quarter-revolution in a four-pole machine. Figs. 15 to 18, inclusive, are diagrams corresponding to Figs. 11 to 14, but illustrating the condition present in the form of machine shown in Fig. 2.

It has been hitherto customary in constructing distributed windings and applying the same to the primary members of rotary-field motors to make each coil embrace that part of the full circumference of the core which is obtained by dividing the same into as many parts as there are poles. Thus if the motor is a four-pole motor each of the coils will cover or embrace ninety degrees of arc, and if a six-pole machine each coil will embrace sixty degrees, &c. This old form of winding, when of the closed-coil type, is shown in Fig. 1, the core being divided, as regards the winding, into four segments and the slots in each segment being numbered from 1 to 8, inclusive. The leads $a\ b\ c\ d$ correspond to one phase of current, and the arrows indicate the direction of current flow when this phase is at a maximum and the other phase, corresponding to the leads $a'\ b'\ c'\ d'$, is at zero. To avoid confusion, the arrows indicating the direction of current flow when the second phase of current is at any other value than zero are omitted.

In this application the term "armature" is applied for convenience of description to that portion of the machine wherein the currents are induced and the term "field-magnet" to the part which receives current from the line, and while the armature is here shown as stationary and the field-magnet as rotatable it is well understood in the art that this relation is reversible.

In each of Figs. 5 to 10 the surface of the drum field-magnet is represented by a straight line $y\ y$. The vertical lines $e\ f\ g\ h$ in these figures indicate at their intersection with the line $y\ y$ the corresponding points in Figs. 1, 2, 3, and 4. In Fig. 5, for example, the shaded wave indicates the various strengths of magnetic field at successive points around the field-magnet when the current of the phase corresponding to leads $a\ b\ c\ d$ is positive and at a maximum and the current of the phase corresponding to leads $a'\ b'\ c'\ d'$ is at zero. It will be seen that the greatest field strength is found only at a point and that the wave is sharp. Of course this may not be the exact form of wave in every respect in any particular machine, but the general principle is illustrated correctly in this figure.

Fig. 6 shows the distribution of magnetism when the current corresponding to leads $a'\ b'\ c'\ d'$ is at a maximum and that corresponding to leads $a\ b\ c\ d$ is at zero. The form of wave is seen to be the same.

In Fig. 7 the dotted lines show the two components which produce the wave shown in shaded form, which latter illustrates the virtual wave of distribution of field strength at the moment when the two currents are equal. It will be seen that this wave has a flat top and that its height is equal to that of the two components. Since the two waves will be equal forty-five degrees in time from their maximum values, it may be demonstrated mathematically that the height of the two component waves shown in dotted lines in Fig. 7 is about three-quarters of that of the simple waves in Fig. 5—that is, it is equal to the maximum value multiplied by sine forty-five degrees.

Figure 11:
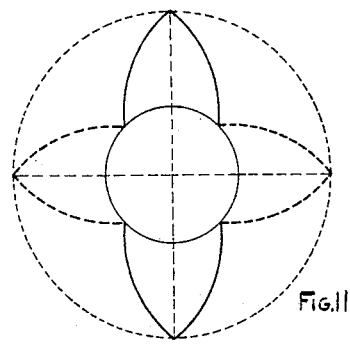
Figure 15:
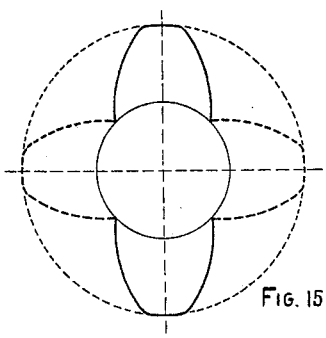
Figure 12:
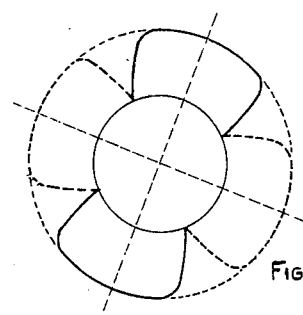
Figure 16:
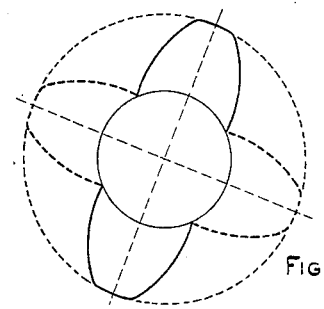
Figure 13:
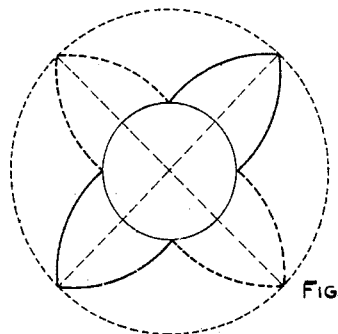
Figure 17:
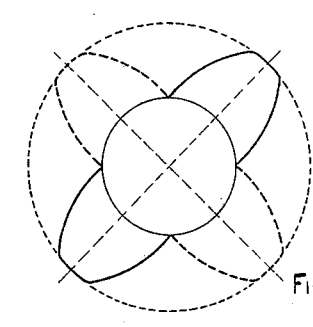
Figure 14:
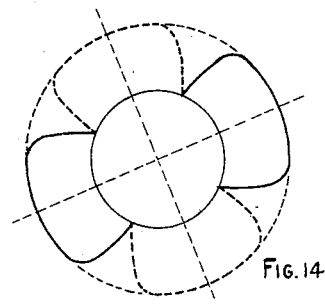
Figure 18:
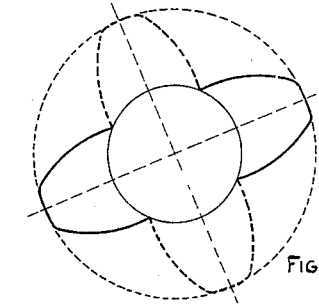

Another method of representation of the magnetic conditions illustrated in Figs. 5, 6, and 7 is found in Figs. 11 to 14, the conditions of Fig. 5 being indicated in Fig. 11 and those of Fig. 6 in Fig. 13. The curves in this case are seen to come to a point, while in Figs. 12 to 14, which correspond to Fig. 7, the tops of the curves are shown flattened, so that over a considerable portion of the surface of the field-magnet the same field strength exists. The different diameters of outside dotted circles in Figs. 11 and 14 on the one hand and in Figs. 12 and 14 on the other indicate the different extremes of field strength present in the two cases. Thus it is seen that not only do the strengths of the poles vary as they rotate in the old form of motor, but there is a sudden change in the extent of surface over which the maximum reaches. Both of these fluctuations are productive of secondary or induced currents which are more or less deleterious. Now if instead of the distribution of windings found in Fig. 1 we use a form of winding in which each coil embraces an arc which is either greater or less than that resulting from dividing the entire surface by the number of poles the magnetic effects of the various coils will "overlap," so to speak, even as the coils themselves overlap, and there will be an interference of inducing efforts which will result in a spreading of the maximum over an increased area and in cutting down the amount of this maximum. I have found that by constructing the coils so that each embraces an arc that is from three-fourths to eight-tenths, the arc resulting from dividing the circumference by the number of poles or by making the first-named arc greater than the second in about the same degree, I can produce very nearly the equivalent of a rotating pole of constant strength without material variation in the space over which the maximum extends. My invention is not limited, however, to any specific degree of variation from the old form of winding.

A four-pole machine having my new form of winding is illustrated in Figs. 2 and 4, wherein it is seen that each coil embraces about three-fourths of ninety degrees.

Upon comparing Figs. 8 to 10 with the corresponding Figs. 5 to 7 it will be seen that when either of the exciting-currents in my improved winding is at a maximum the magnetic waves of distribution are flat at the top and their height is only about three-fourths of that of the sharp-pointed waves indicated in said Figs. 5 to 7. This relation of the two forms of distribution-waves will be more readily understood by reference to Figs. 1, 2, 3, and 4.

In the construction indicated in Figs. 1 and 2 the conductors in the several slots are so located that the several magnetic effects of their currents are arranged in four groups, there being eight slots in each group. The magnetic effects in each group thus combine to form a magnetic pole, which gradually increases in strength or value from the points $h$ and $f$ to the points $g$ and $e$.

In the form illustrated in Figs. 2 and 4 the two currents in each of the slots 1 and 8 oppose each other, and hence there is nothing added to the magnetic field by virtue of these currents. It will be readily seen, therefore, that the number and location of these conductors and slots with reference to the other conductors and slots of the respective groups are such that the height of the distribution-wave will be substantially three-fourths of the height which would be secured if the magnetic effect of the currents in the coils 1 and 8 were not neutralized. Of course the number of slots and conductors in each group might be made such as to make the ratio between the flattened wave and the sharp-pointed wave different from that which obtains in the construction illustrated. It will be understood also that the magnetism due to the other phase of current will be shifted, as indicated in Figs. 6 and 9, and that the interfering non-effective currents of that phase will be in the conductors located in slots 4 and 5.

The resultant wave shown in Fig. 10 and corresponding to that shown in Fig. 7 approximates very closely in form to that of the wave shown in Figs. 8 and 9, it being higher than either of its components. Comparing these figures with Figs. 15 to 18 as Figs. 5 to 7 were compared with Figs. 11 to 14 it will be seen that in each successive position of the wave of magnetic distribution its shape remains the same, or approximately so, and that in all there is substantially the same height representing the maximum.

It will of course be understood that my above-described invention is applicable to machines of any desired number of poles driven by currents of any desired number of phases, and I therefore do not intend to limit the scope of my invention in these respects to what is specifically illustrated and described.

I claim as my invention—

1. A rotary-field motor having a primary member provided with a distributed winding located beneath the surface of the core and in proximity to the adjacent surface of the secondary member, the coils of said winding being superposed and severally embracing a peripheral core-space which differs from that obtained by dividing the circumference by the number of poles, substantially as and for the purpose set forth.

2. In a non-synchronous motor, a field-magnet or primary member having a distributed winding each coil of which embraces a peripheral core-space the width of which is greater or less than that obtained by dividing the whole circumference by the number of poles, said coils being of substantially the same length and form and symmetrically arranged, substantially as described.

3. In a non-synchronous motor, a field-magnet or primary member having a distributed winding each coil of which embraces a peripheral core-space which differs from the arc resulting from dividing the whole circumference by the number of poles, said coils being substantially alike in form and dimensions and symmetrically arranged with their sides in close proximity to the adjacent surface of the armature or secondary member, substantially as described.

4. In a non-synchronous motor, a field-magnet or primary member having a distributed winding each coil of which embraces a peripheral core-space which is less than the arc formed by dividing the circumference by the number of poles, in combination with an armature or secondary member in inductive relation thereto, substantially as described.

In testimony whereof I have hereunto subscribed my name this 27th day of April, A. D. 1894.

BENJ. G. LAMME.

Witnesses:
JAS. W. SMITH,
HAROLD S. MACKAYE.